Figure 1:
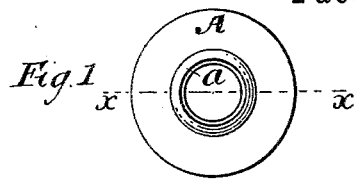

(No Model.)

D. DODD.
RIBBED CONOIDAL WASHER.

No. 398,952. Patented Mar. 5, 1889.

WITNESSES:
Geo. Wadman.
A. M. Jones.

INVENTOR:
David Dodd,
Per Edw. E. Lumby
Atty.

UNITED STATES PATENT OFFICE.

DAVID DODD, OF ORANGE, ASSIGNOR TO THE NATIONAL LOCK WASHER COMPANY, OF NEWARK, NEW JERSEY.

RIBBED CONOIDAL WASHER.

SPECIFICATION forming part of Letters Patent No. 398,952, dated March 5, 1889.

Application filed May 25, 1888. Serial No. 275,041. (No model.)

*To all whom it may concern:*

Be it known that I, DAVID DODD, of Orange, New Jersey, have invented a certain Improvement in Ribbed Conoidal Washers, of which the following is a specification.

This improvement relates to a lock-washer of the type in which a rib is provided upon the side, which is intended for impact against the nut, in order that when the nut is screwed home the apex of the rib, by embedding itself into the face of the nut, will displace and force a portion of the metal of the nut convergently against the bolt. There have been heretofore known two kinds of such washers. One is the comparatively thin flat washer, provided with a projecting rib around its inner edge, shown and described in Letters Patent of the United States No. 258,422, dated May 23, 1882, and the other is the spiral washer, provided with a rib around its concave edge, shown and described in Letters Patent of the United States No. 340,308, dated April 20, 1886. The latter is necessarily made of a comparatively thick bar of steel, and thus resists compression with such energy that the rib begins its work of displacing the metal of the nut soon after the nut acquires contact with it, and continues in the performance of its work during the period while the nut is being turned the requisite number of revolutions to effect the compression of all the parts of the spiral washer into the same plane. On the contrary, in the case of the thin flat washer contact is not made with the apex of the rib until the nut has been screwed nearly home, and the result is that the nut jams upon the washer before the desired extent of convergent displacement of the metal of the nut has been effected.

The object of the present invention is to give to the comparatively thin ribbed washer an increased capacity of effecting the progressive convergent displacement of the metal of the nut; and the invention consists in giving to the thin ribbed washer a conoidal or dished form, so that when its outer edge is bearing upon the surface of the object through which the bolt is inserted the rib around its inner edge will acquire contact with the face of the nut, and will begin its work of convergently compressing the metal of the nut toward the bolt at an earlier stage in the operation of screwing the bolt home, and will continue its work during the period while the nut is being turned to the extent required to compress the inner portion of the washer into the same plane as the outer portion.

Figure 2:
Figure 3:
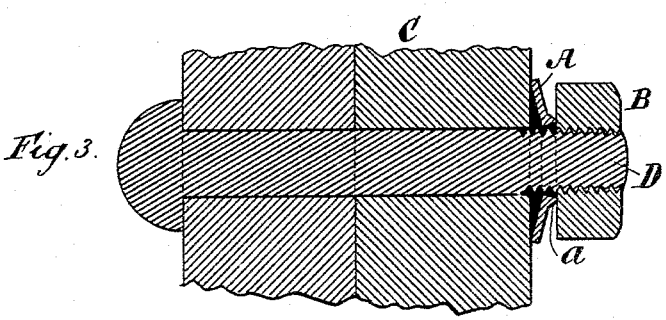
Figure 4:
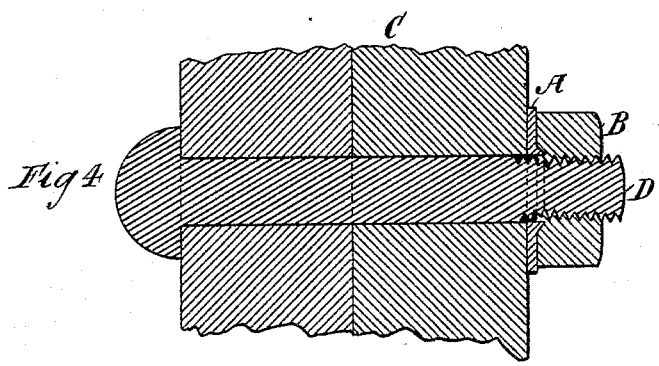
Figure 5:
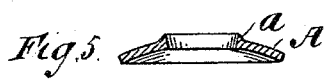
Figure 6:

The accompanying drawings, showing a ribbed conoidal washer embodying the invention and illustrating its operation when in use, are as follows:

Figure 1 is a top view of a ribbed conoidal or dished washer. Fig. 2 is a transverse section through the line $x\,x$ on Fig. 1. Fig. 3 is a sectional view of a bolt, an object through which the bolt is inserted, a nut applied to the bolt, and a ribbed conoidal washer interposed between the nut and the object through which the bolt is inserted. Fig. 4 is a sectional view similar to Fig. 3, except that it shows the nut screwed home, and exhibits in an exaggerated way the displacement of the metal of the nut caused by the impingement upon its face of the rib with which the washer is provided. Figs. 5 and 6 are transverse sections of a ribbed washer, illustrating slight modifications in the shape of the dishing thereof.

The washer A is a dished ring of comparatively thin flat steel, provided with a projecting V-shaped rib, $a$, around its inner edge upon the side which is intended for impact against the nut. The dishing shape of the washer will usually be given to it by means of suitably-shaped punches and dies.

The washer shown in Fig. 1 has, it will be seen, the shape of the frustum of a hollow cone, the angles of the sides of which with its base are extremely acute.

In the modification illustrated in Fig. 5 the washer, as will be seen, has the shape of the segment of a sphere. In the modification illustrated in Fig. 6 the transverse curvature of the sides is the reverse of that shown in Fig. 5. The different forms of washer illustrated in the drawings are substantially alike in their mode of operation, and are all intended to be comprehended under the terms "conoidal washer" or "dished washer."

In Fig. 3 the washer A is represented as interposed between the nut B and the surface of the object C through which the bolt D is inserted. The face of the nut adjacent to the object through which the bolt is inserted is represented as having just acquired contact with the apex of the rib $a$.

In Fig. 4 the nut is represented as screwed home, whereby the rib $a$ has been caused to embed itself into the face of the nut and to convergently compress upon the bolt a portion of the metal of the nut, and the central portion of the washer has been compressed into the same plane as the outer portion.

The washer A is made of suitably-hardened steel, and hence bears with elastic pressure on one side against the face of the object through which the bolt is inserted and on the other side against the nut. Owing to the resistance which the conoidal washer opposes to compression, the rib $a$ begins the performance of its function of displacing the metal of the nut and effecting its convergent movement toward the bolt when the parts have acquired the position in which they are represented in Fig. 3, and such convergent movement continues to be progressively effected while the washer is gradually yielding to the compression due to the screwing home of the nut, and until the parts acquire the relative positions in which they are represented in Fig. 4.

It is to be understood that the dishing of the washers may be either more or less than that represented in the drawings without departure from the invention. In practice the dished washers will be given a rather low spring temper, in order that they may yield to compression without breaking.

What is claimed as the invention is—

1. The new article of manufacture herein shown and described, the same consisting of a conoidal or dished washer provided with a circular V-shaped rib adjacent to the concave edge of that one of the sides of the washer which is intended for impact against the face of the nut.

2. The combination, as herein set forth, of a bolt and nut of ordinary construction with a conoidal or dished washer provided upon that one of its sides which bears against the nut with a circular V-shaped rib, all parts of the apex of which after it has acquired contact with the nut are made by the screwing home of the nut to simultaneously embed themselves in the face of the nut, and to thereby effect the progressive movement of a portion of the nut toward the bolt while the central portion of the washer is being forced toward and against the surface of the object upon which the outer portion of the washer bears.

DAVID DODD.

Witnesses:
JOHN W. KNAUSE,
WILLIAM RAYNER.